Aug. 30, 1966  W. C. SAUNDERS, JR  3,269,051
AUTOMATIC WEIGHT RELEASE MECHANISM FOR FISHING LINES
Filed Sept. 29, 1964
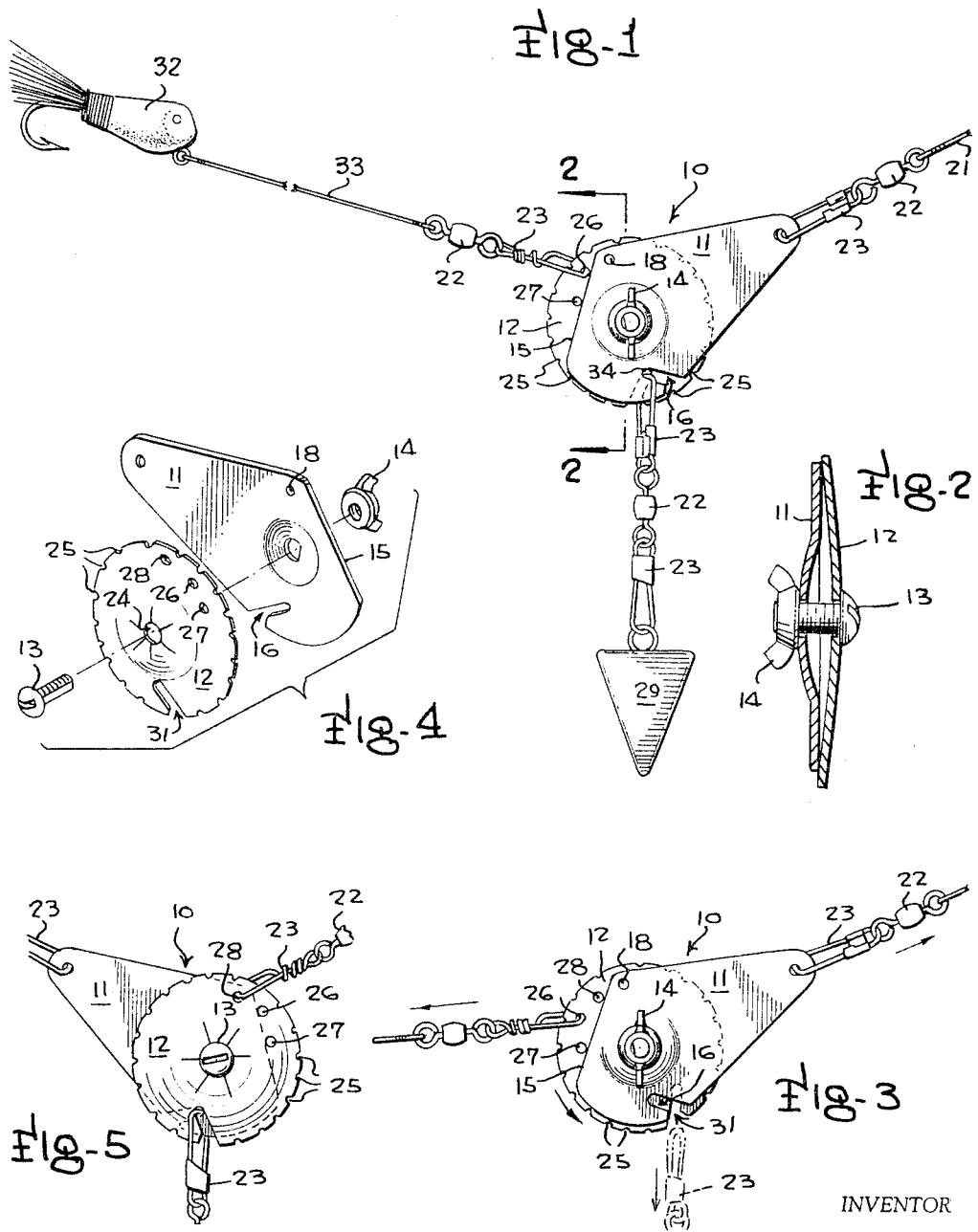
INVENTOR
W. CONWAY SAUNDERS, JR.
BY Mason, Fenwick & Lawrence
ATTORNEYS

United States Patent Office 3,269,051
Patented August 30, 1966

3,269,051
AUTOMATIC WEIGHT RELEASE MECHANISM
FOR FISHING LINES
Walter Conway Saunders, Jr., Coles Point, Va.
Filed Sept. 29, 1964, Ser. No. 400,058
6 Claims. (Cl. 43—43.12)

This invention relates generally to fishing tackle and more particularly to devices whereby the heavy sinker used in deep trolling operations is automatically released at a predetermined amount of pull upon the fishing lure leader line after the strike of the fish.

In prior art devices of this type, the trend has been to design and manufacture sinker releases of relatively complex nature. Generally, these prior art devices have been of a construction which requires a spring or other tensioning means to insure proper functioning at the desired time. However, the complex nature of such devices is completely undesirable since they must be operated in an environment which is highly detrimental to delicate mechanical parts. Further, a use of a device such as is described has the disadvantage that the tension of a spring opposes the pull exerted on the line by the striking fish thereby reducing the sensitivity of the fishing equipment to the strike so that the angler may not be fully aware that a fish is on his line.

Therefore, an object of this invention is the provision of a sinker release mechanism having extreme sensitivity to the strike of a fish.

Another object of this invention is a provision of a sinker release mechanism designed primarily for deep sea trolling or bottom fishing which requires a heavy weight or sinker and which device includes means for releasing the sinker when the fish is caught at a predetermined pull on the line by the fish, thus making it possible for the fisherman to have the pleasure and sport of playing the fish free from the drag of the large weight necessitated by the deep fishing.

A still further object of this invention is the provision of a sinker release mechanism in which the fisherman may vary the degree of pull needed to be exerted by a caught fish to operate the mechanism so arranged as to prevent the sinker being released except at times desired by the fisherman.

Another object of this invention is the provision of a sinker release mechanism having the bare minimum number of component parts which provides for ease of construction, inexpensive manufacture, and efficient service.

Other objects, advantages and capabilities of the invention will become apparent from the following description, taken in conjunction with the accompanying drawings showing only a preferred embodiment of the invention.

In the drawings:

FIGURE 1 is a side elevation view of the sinker release mechanism of the present invention showing it in operative position before the strike of a fish.

FIGURE 2 is a vertical section view of the sinker release mechanism taken along lines 2—2 of FIGURE 1.

FIGURE 3 is a side elevation view of the sinker release mechanism showing the sinker being disengaged at such time as the weight of a caught fish has properly operated the mechanism.

FIGURE 4 is an exploded perspective view of the entire mechanism showing the relative location of its exceedingly few parts; and FIGURE 5 is a side elevation view of the sinker release mechanism so arranged as to prevent the release of the sinker at any time.

Referring to the drawings wherein like reference characters designate corresponding parts throughout the several figures, the sinker release mechanism of the present invention is generally designated by the numeral 10. Comprising the operative parts of the sinker release mechanism 10 is an elongated side plate 11 and a circular side plate 12 being held closely adjacent one another by a through bolt 13 projecting through the elongated side plate 11 and circular side plate 12 wherein its free end is adapted to receive a wing nut 14. The side plates should preferably be made of clear plastic so as to be invisible to the fish, however, any noncorrosive material will suffice.

At one end of the elongated side plate 11 is a relieved peripheral zone defined by a flat extending along a chord of a circle, indicated by numeral 15. The bottom peripheral surface of the side plate 11, generally beneath the flat 15, has a sinker receiving recess 16 projecting generally toward the central aperture 17 of side plate 11. Recess 16 is elongated in shape and projects inwardly of the elongated side plate 11 a sufficient distance to accomplish the purpose of the invention as will be described below. Near the top portion of the side plate 11 and closely adjacent to flat 15 is an aperture through the plate noted by numeral 18 which serves as a locking aperture. The other end of the elongated side plate 11 narrows in a tapered configuration and has located therethrough a line receiving aperture 17 to which the fisherman connects the fishing line 21. The fishing line 21 may be connected to aperture 19 by any such well known means as a connecting swivel 22 and a snap type clip 23. As is easily seen from the section view of FIGURE 2, elongated side plate 11 has a slightly dished out or convexed exterior configuration symmetrical about the central aperture 17.

The circular side plate 12 has a convex exterior configuration similar to that described for side plate 11 whereby the entire central portion of plate 12 is dished out symmetrically about its central aperture 24. Located about the periphery of side plate 12 are a plurality of notches 25 providing an easily accessible grip means for the fisherman in order that he may easily position circular plate 12 relative to plate 11.

Located inwardly above the periphery of side plate 12 are a pair of lure attachment apertures 26, 27 which provide means for changing the moment arm of the fishing lure with respect to the center of rotation of the sinker release mechanism. Spaced from lure attachment aperture 26 is circular plate locking aperture 28 which is designed to register with aperture 18 of plate 11 when the entire device is so positioned as to prevent the sinker 29 from being released. Beginning at the periphery of side plate 12 and extending inwardly is circular plate sinker release recess 31, which, when the device is in operation, opens oppositely to the receiving recess 16 of plate 11. As can be seen from FIGURE 1, the recesses 16 and 31 cooperate in such a manner as to hold the sinker clip 23 in a closed recess 34 formed by the positioning of the side plates 11 and 12 relative to one another.

Adapted to be connected to circular plate 12 is a fish lure 32 having connected to it a leader line 33 which interconnects with a connecting swivel 22 and is secured to plate 12 by clip 23. The sinker 29 is likewise adapted to be connected to the mechanism 10 by suitable swivels 22 and clips 23.

In operation of the present device, the fisherman would position the concave portions of circular plate 12 and elongated plate 11 adjacent one another and then insert bolt 13 through the central apertures 17, 24 and then tighten wing nut 14 upon the bolt 13 until it rests adjacent plate 12 to provide the proper tension between the adjacent members. By adjusting the wing nut 14 upon bolt 13, a compressive force is applied to plates 11 and 12 thereby providing the desired amount of friction between the various components of the mechanism. The lure leader line 33 would then be positioned in one of the two attachment apertures 26 or 27 by means of clip 23. Before attaching the sinker weight 29, plates 11 and 12 would be rotated relative to one another so that the relatively small closed recess 34 formed by the juncture of the bottom of the recesses 16 and 31 is left through which the sinker clip 23 is inserted. Of course, it should be noted that the fishing line 21 would be connected through line aperture 19 in a manner similar to that shown in FIGURE 1. Once the trolling operation has begun, the heavy sinker 29 would seek its level within the water and upon the fish making a strike at the lure 32 the line of pull between the lure 32 and the fishing line 21 it tends to become a straight line through the center of bolt 13 thereby causing the circular plate 12 to revolve about its center due to the exertion of considerable force on leader 33 by its moment arm with respect to the center of plate 12. Such a happening is shown by FIGURE 3 at which time, when the plate 12 has revolved relative to plate 11 a sufficient distance to bring the openings of recesses 16 and 31 into registry, the sinker weight and its associated connecting members will fall from the recesses due to the force of gravity. At this time, the fisherman only has the weight of the fish upon his line and need not be bothered by the heavy sinker.

FIGURE 5 depicts the condition wherein the fisherman desires not to release the sinker weight upon the strike of the fish and, therefore, he has positioned the lure leader clip 23 through the registered locking apertures 18 and 28 to prevent rotation between plates 11 and 12 upon the strike of a fish.

The above description has shown an exceedingly simple and practical sinker release mechanism such as has not been disclosed in the prior art and one which derives its great practicality from its simplicity of construction and extreme ease of use.

While I have particularly shown and described one particular embodiment of the invention, it is distinctly understood that the invention is not limited thereto but that modifications may be made within the scope of the invention and such variations as are covered by the scope of the appended claims.

What is claimed is:

1. A sinker releasing mechanism for connection between a fishing line and a lure leader adapted to support a sinker in a normally depending position and to release the sinker responsive to a predetermined amount of force exerted on the lure leader by a striking fish, comprising a pair of side plates having adjustable mounting means holding the plates closely adjacent one another with a predetermined compression force, one of the plates being of a flat elongated configuration having at one end a tapered portion and at the other end a rounded portion, the tapered portion having a fishing line receiving aperture therethrough for interconnection with a portion of a fishing line, the other side plate being of circular configuration having a central aperture, there being a central aperture in the rounded portion of the elongated side plate adapted to register with the central aperture of the circular side plate, said apertures being adapted to receive said mounting means, there being a sinker receiving recess in the bottom of the rounded portion of the elongated side plate, lure attachment means located near the periphery of the circular side plate to provide predetermined moment arms to the lure leader with respect to the center of the circular side plate, there being a sinker receiving recess in the bottom of the circular side plate projecting generally toward the center of the plate in a manner that opposes the longitudinal length of the elongated side plate sinker receiving recess to form a closed sinker receiving recess in conjuction with the elongated side plate so that the sinker is adapted to be held in operative position in the closed sinker receiving recess whereby in response to a pull exerted upon the lure leader the circular side plate is rotated with respect to the elongated side plate to open the closed sinker receiving recess thereby releasing the sinker from engagement with the release mechanism.

2. A sinker releasing mechanism for connection between a fishing line and a lure leader adapted to support a sinker in a normally depending position and to release the sinker responsive to a predetermined amount of force exerted on the lure leader by a striking fish, comprising a pair of side plates having adjustable mounting means holding the plates closely adjacent one another with a predetermined compression force, one of the plates being of a flat elongated configuration having at one end a tapered portion and at the other end a rounded portion, the rounded portion of the elongated side plate having a convex exterior configuration, the tapered portion having a fishing line receiving aperture therethrough for interconnection with a portion of a fishing line, the other side plate being of circular configuration having a central aperture, there being a central aperture in the rounded portion of the elongated side plate adapted to register with the central aperture of the circular side plate, said apertures being adapted to receive said mounting means, there being a sinker receiving recess in the bottom of the rounded portion of the elongated side plate, lure attachment means located near the periphery of the circular side plate to provide predetermined moment arms to the lure leader with respect to the center of the circular side plate, there being a sinker receiving recess in the bottom of the circular side plate projecting generally toward the center of the plate in a manner that opposes the longitudinal length of the elongated side plate sinker receiving recess to form a closed sinker receiving recess in conjunction with the elongated side plate so that the sinker is adapted to be held in operative position in the closed sinker receiving recess whereby in response to a pull exerted upon the lure leader the circular side plate is rotated with respect to the elongated side plate to open the closed sinker receiving recess thereby releasing the sinker from engagement with the release mechanism.

3. A sinker releasing mechanism for connection between a fishing line and a lure leader adapted to support a sinker in a normally depending position and to release the sinker responsive to a predetermined amount of force exerted on the lure leader by a striking fish, comprising a pair of side plates having adjustable mounting means holding the plates closely adjacent one another with a predetermined compression force, one of the plates being of a flat elongated configuration having at one end a tapered portion and at the other end a rounded portion, the rounded portion of the elongated side plate having a convex exterior configuration, the tapered portion having a fishing line receiving aperture therethrough for interconnection with a portion of a fishing line, the other side plate being of circular configuration having a central aperture, the rounded portion of the elongated side plate having a relieved peripheral zone therein defined by a flat extending along a chord of a circle, there being a central aperture in the rounded portion of the elongated side plate adapted to register with the central aperture of the circular side plate, said apertures being adapted to receive said mounting means, there being a sinker receiving recess in the bottom of the rounded portion of the elongated side plate, lure attachment means located near the periphery of the circular side plate to provide predetermined moment arms to the lure leader with respect to the center of the circular side plate, there being a sinker receiving recess in the bottom of the circular side plate projecting generally toward the center of the plate in a manner that opposes the longitudinal length of the elongated side plate sinker receiving recess to form a closed sinker receiving recess in conjuction with the elongated side plate so that the sinker is adapted to be held in operative position in the closed sinker receiving recess whereby in response to a pull exerted upon the lure leader the circular side plate is rotated with respect to the elongated side plate to open the closed sinker receiving recess thereby releasing the sinker from engagement with the release mechanism.

4. A sinker releasing mechanism for connection between a fishing line and a lure leader adapted to support a sinker in a normally depending position and to release the sinker responsive to a predetermined amount of force exerted on the lure leader by a striking fish, comprising a pair of side plates having adjustable mounting means holding the plates closely adjacent one another with a predetermined compression force, one of the plates being of a flat elongated configuration having at one end a tapered portion and at the other end a rounded portion, the tapered portion having a fishing line receiving aperture therethrough for interconnection with a portion of a fishing line, the other side plate being of circular configuration having a central aperture, there being a central aperture in the rounded portion of the elongated side plate adapted to register with the central aperture of the circular side plate, said apertures being adapted to receive said mounting means, locking means in the tops of each side plate adapted to maintain the elongated side plate fixed relative to the circular side plate at desired times, there being a sinker receiving recess in the bottom of the rounded portion of the elongated side plate, lure attachment means located near the periphery of the circular side plate to provide predetermined moment arms to the lure leader with respect to the center of the circular side plate, there being a sinker receiving recess in the bottom of the circular side plate projecting generally toward the center of the plate in a manner that opposes the longitudinal length of the elongated side plate sinker receiving recess to form a closed sinker receiving recess in conjunction with the elongated side plate so that the sinker is adapted to be held in operative position in the closed sinker receiving recess.

5. A sinker releasing mechanism for connection between a fishing line and a lure leader adapted to support a sinker in a normally depending position and to release the sinker responsive to a predetermined amount of force exerted on the lure leader by a striking fish, comprising a pair of side plates having adjustable mounting means holding the plates closely adjacent one another with a predetermined compression force, one of the plates being of a flat elongated configuration having at one end a tapered portion and at the other end a rounded portion, the tapered portion having a fishing line receiving aperture therethrough for interconnection with a portion of a fishing line, the other side plate being of circular configuration having a central aperture, there being a central aperture in the rounded portion of the elongated side plate adapted to register with the central aperture of the circular side plate, said apertures being adapted to receive said mounting means, there being a sinker receivign recess in the bottom of the rounded portion of the elongated side plate, the circular side plate having a convex exterior configuration symmetrical about the central aperture, lure attachment means located near the periphery of the circular side plate to provide predetermined moment arms to the lure leader with respect to the center of the circular side plate, there being a sinker receiving recess in the bottom of the circular side plate projecting generally toward the center of the plate in a manner that opposes the longitudinal length of the elongated side plate sinker receiving recess to form a closed sinker receiving recess in conjunction with the elongated side plate so that the sinker is adapted to be held in operative position in the closed sinker receiving recess whereby in response to a pull exerted upon the lure leader the circular side plate is rotated with respect to the elongated side plate to open the closed sinker receiving recess thereby releasing the sinker from engagement with the release mechanism.

6. A sinker releasing mechanism for connection between a fishing line and a lure leader adapted to support a sinker in a normally depending position and to release the sinker responsive to a predetermined amount of force exerted on the lure leader by a striking fish, comprising a pair of side plates having adjustable mounting means holding the plates closely adjacent one another with a predetermined compression force, one of the plates being of a flat elongated configuration having at one end a tapered portion and at the other end a rounded portion, the rounded portion of the elongated side plate having a convex exterior configuration, the tapered portion having a fishing line receiving aperture therethrough for interconnection with a portion of a fishing line, the other side plate being of circular configuraiton having a central aperture, the rounded portion of the elongated side plate having a relieved peripheral zone therein defined by a flat extending along a chord of a circle, there being a central aperture in the rounded portion of the elongated side plate adapted to register with the central aperture of the circular side plate, said apertures being adapted to receive said mounting means, there being a sinker receiving recess in the bottom of the rounded portion of the elongated side plate projecting generally toward the relieved peripheral zone thereof, the circular side plate having a convex exterior configuration symmetrical about the central aperture, lure attachment means located near the periphery of the circular side plate and positioned in the relieved peripheral zone of the elongated side plate when the releasing mechanism is in operative position to provide predetermined moment arms to the lure leader with respect to the center of the circular side plate, there being a sinker receiving recess in the bottom of the circular side plate projecting generally toward the center of the plate in a manner that opposes the longitudinal length of the elongated side plate sinker receiving recess to form a closed sinker receiving recess in conjunction with the elongated side plate so that the sinker is adapted to be held in operative position in the closed sinker receiving recess whereby in response to a pull exerted upon the lure leader the circular side plate is rotated with respect to the elongated side plate to open the closed sinker receiving recess thereby releasing the sinker from engagement with the release mechanism.

References Cited by the Examiner
UNITED STATES PATENTS
2,830,400   4/1958   Perry _____ 43—43.12

ABRAHAM G. STONE, *Primary Examiner.*

R. L. HOLLISTER, *Assistant Examiner.*